(12) United States Patent
Milne et al.

(10) Patent No.: US 8,413,719 B2
(45) Date of Patent: Apr. 9, 2013

(54) RELATIVE PERMEABILITY MODIFICATION

(75) Inventors: Arthur Milne, Martinez (AR); Eric Gin Wai Lian, Villahermosa (MX); Sandra Janette Montoya Padilla, Medellin (CO); Mario Ulloa, Aguascalientes (MX); Frederic Vincent Martin, Argentan (FR); Mathew M. Samuel, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 327 days.

(21) Appl. No.: 12/710,565

(22) Filed: Feb. 23, 2010

(65) Prior Publication Data

US 2010/0230106 A1 Sep. 16, 2010

Related U.S. Application Data

(60) Provisional application No. 61/211,193, filed on Mar. 27, 2009, provisional application No. 61/159,300, filed on Mar. 11, 2009.

(51) Int. Cl.
*E21B 43/22* (2006.01)
*E21B 33/138* (2006.01)

(52) U.S. Cl. ........ 166/300; 166/279; 166/281; 166/282; 166/292; 166/305.1; 166/307

(58) Field of Classification Search ........................ None
See application file for complete search history.

(56) References Cited

U.S. PATENT DOCUMENTS

| | | | |
|---|---|---|---|
| 7,182,136 B2 | 2/2007 | Dalrymple et al. | |
| 7,482,311 B2 | 1/2009 | Willberg et al. | |
| 2004/0229757 A1 | 11/2004 | Eoff et al. | |
| 2005/0000694 A1 | 1/2005 | Dalrymple et al. | |
| 2005/0155796 A1 | 7/2005 | Eoff et al. | |
| 2005/0194140 A1 | 9/2005 | Dalrymple et al. | |
| 2006/0234871 A1 | 10/2006 | Dalrymple et al. | |
| 2006/0234874 A1 | 10/2006 | Eoff et al. | |
| 2006/0240994 A1 | 10/2006 | Eoff et al. | |
| 2007/0012445 A1 | 1/2007 | Nguyen et al. | |
| 2007/0029087 A1 | 2/2007 | Nguyen et al. | |
| 2007/0039732 A1 | 2/2007 | Dawson et al. | |
| 2007/0062697 A1 | 3/2007 | Barbosa et al. | |
| 2008/0110624 A1 | 5/2008 | Nguyen et al. | |
| 2008/0173448 A1 | 7/2008 | Nguyen et al. | |
| 2008/0200352 A1 | 8/2008 | Willberg et al. | |
| 2008/0217012 A1* | 9/2008 | Delorey et al. | ............... 166/300 |

FOREIGN PATENT DOCUMENTS

| | | |
|---|---|---|
| EP | 2186870 | 5/2010 |
| WO | 02083743 | 10/2002 |
| WO | 2005003515 | 1/2005 |
| WO | 2007057637 | 5/2007 |

OTHER PUBLICATIONS

SPE21000—Polymer Treatment for Water Control in High-Temperature Production Wells—Kohler, N., Zaitoun, A. Presented at SPE International Symposium on Oilfield Chemistry, Anaheim California, Feb. 20-22, 1991.
SPE28984—Comparative Laboratory Selection and Field Testing of Polymers for Selective Control of Water Production in Gas Wells—Ranjbar, M., Czolbe, P, Kohler, N. Presented at SPE International Symposium on Oilfield Chemistry, San Antonio, Texas, Feb. 14-17, 1995.
SPE89413—Development of Associative Polymer Technology for Acid Diversion in Sandstone and Carbonate Lithology—Eoff, L., Dalrymple, D., Reddy, B.R. Presented at the 2004 SPE/DOE Fourteenth Symposium on Improved Oil Recovery, Tulsa, Apr. 17-21, 2004.
SPE103771—A New Method for Acid Stimulation Without Increasing Water Production: Case Studies from Offshore Mexico—Reza, G.H., Soriano, E., Eoff, L., Dalrymple, D. Presented at First International Oil Conference and Exhibition in Mexico held in Cancun, Mexico. Aug. 31-Sep. 2, 2006.
SPE107584—Relative-Permeability Modifiers and Their Use in Acid Stimulation in HP/HT Low-Permeability Carbonate Formations: Offshore Mexico Cases. Soriano Duverney, E., Robles, F., Lopez, A.I., Steffani, O. Presented at the 2007 SPE Latin American and Caribbean Petroleum Engineering Conference held in Buenos Aires, Argentina, Apr. 15-18, 2007.
SPE106951—Simultaneous Acid Diversion and Water Control in Carbonate Reservoirs: A Case History from Saudi Arabia—Al-Taq, A.A., Nasr-El-Din, H.A., Beresky, J.K., Naimi, K.M., Sierra, L., Eoff, L. Presented at the 2007 SPE Europec, London Jun. 11-14, 2007.

* cited by examiner

*Primary Examiner* — Zakiya W Bates
(74) *Attorney, Agent, or Firm* — Jeremy Tillman; Daryl Wright; Robin Nava

(57) ABSTRACT

A fluid containing a viscous hyposaline aqueous solution of first and second cationic polymers that include quatemized ammonium groups, wherein the first cationic polymer includes a hydrophilic base polymer structure and the second cationic polymer includes a lipophilic base polymer Also disclosed is a method of introducing the viscous fluid into an initial first interval of a subterranean formation, and diverting with the viscous fluid a treating fluid from the initial first interval to an initial second interval.

25 Claims, 5 Drawing Sheets

RELATIVE PERMEABILITY MODIFICATION

CROSS REFERENCE TO RELATED APPLICATION(S)

This application is a nonprovisional of and claims the benefit of priority to U.S. 61/211,193 filed Mar. 27, 2009 and to U.S. 61/159,300 filed Mar. 11, 2009.

BACKGROUND

Formations containing oil or gas in many cases also have water present. These formations will produce water along with the hydrocarbons; however, due to the heterogeneity of many formations, water will flow preferentially from certain intervals. When low viscosity treating fluids are injected into the matrix of the formation, below the fracturing pressure, such as in matrix acidizing to try to increase the production of fluids from the reservoir, there is a tendency for the treating fluid to enter preferentially into the intervals with the highest water saturation, due to the lower viscosity and higher mobility of water compared to oil in most reservoirs. The increase in water production after these treatments is usually greater than any associated increase in oil or gas.

A relative permeability modifier (RPM) is generally a compound, usually a polymer, which when injected into a formation will adsorb onto the surface of the rock matrix and significantly reduce the relative permeability of the formation to water. Following RPM treatment, the formation should produce oil and/or gas at about the same or at an increased rate as prior to the treatment, but with less water due to the reduced effective permeability of the formation to water. Reducing the relative permeability to water in intervals which have high water saturation should, in theory, decrease water production from these intervals after the treatment.

It has also been known to use a diverter stage to divert a treating fluid stage away from intervals in which the fluid is initially being injected, which are usually the intervals with the highest matrix permeability and/or highest water saturation. It has proven difficult to divert a treating fluid away from the high-permeability matrices. As a consequence the failure rate in diversion treatments is high, and it has been common, due to excessive water production, to abandon intervals unsuccessfully treated with diversion.

Cationic polyacrylamides have been proposed for use in RPM treatments, but with only limited success. It has been reported, for example, that cationic polyacrylamide in freshwater aqueous solution binds poorly to formation surfaces. The prior art has thus attempted to adsorb the cationic polyacrylamide onto the formation rock in a saline solution at a low pH (acidic) for best RPM performance; however, even where high salinity and low pH are appropriate applications, many RPM water-control compounds are unstable at these conditions and/or they may degrade with increased temperature, further limiting their application. The art continues to search for RPM water-control treatment fluids and methods suitable for a wider range of application conditions.

SUMMARY

We have found that a mixture of water-soluble cationic polymers, wherein one is hydrophilic and one has a lipophilic base polymer structure, can be effectively used for relative permeability modification.

The present invention in one embodiment provides a fluid comprising a viscous hyposaline aqueous solution of first and second cationic polymers comprising quaternized ammonium groups. The first cationic polymer comprises a hydrophilic base polymer structure, for example a cationic polyacrylamide (CPAM), and the second polymer comprises a cationic polymer with a lipophilic base polymer structure (CPLB), for example a homopolymer or copolymer of a quaternized alkylammonium methacrylate ester. In another embodiment, the aqueous fluid is viscosified by the first and second cationic polymers, and in a further embodiment the fluid comprises a polysaccharide. In one embodiment, the CPLB is used at a loading effective to inhibit water sensitivity which might otherwise result in damage to permeability in formations containing water-sensitive clays or shales.

In another embodiment, the viscous fluid is used in a method to divert treating fluids from one interval to another. When the fluid is injected into an interval in a formation according to one embodiment, it will temporarily plug the pore throats in the matrix and so divert the flow of a treating fluid to other intervals. The cationic polymers in the viscous fluid in one embodiment adsorb on the surface of the pore spaces in the matrix reducing the effective permeability to water of the matrix. This can limit the production of water subsequent to the treatment, while allowing hydrocarbon production at the same or an increased rate. This ensures that hydrocarbon production is increased by the treatment, but not water production.

DETAILED DESCRIPTION

Figure 1:
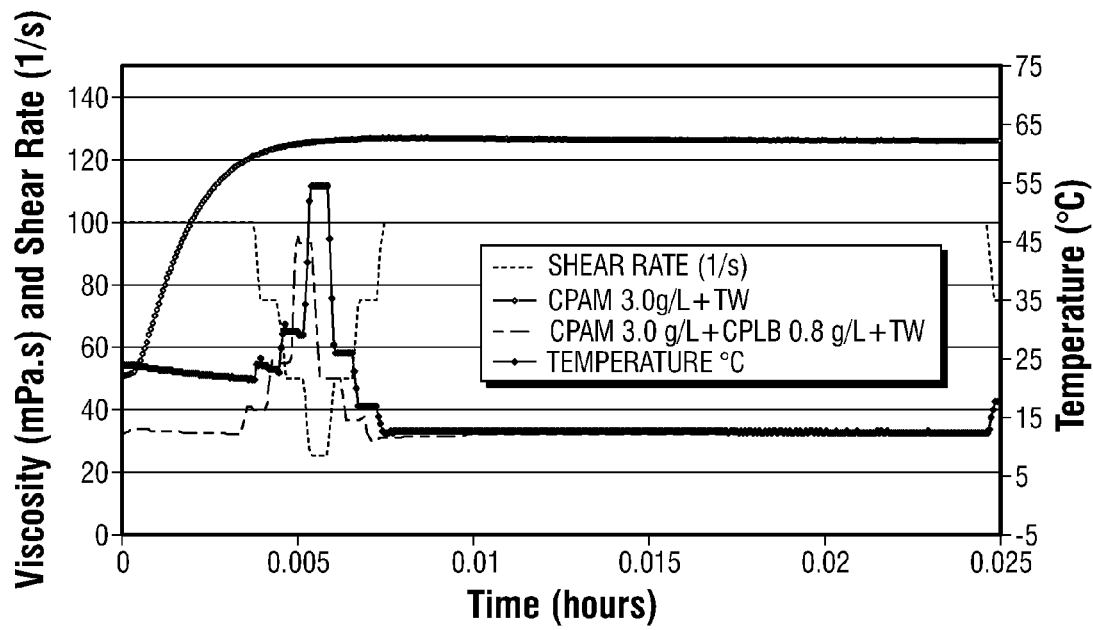
FIG. 1 compares the viscosity profiles of fluids prepared by hydrating 3 g/L (25 pounds per thousand gallons (ppt)) cationic polyacrylamide (CPAM) in tap water with and without 0.8 g/L lipophilic-base cationic polymer (CPLB), according to an embodiment as described in Example 1.

According to an embodiment, a method comprises introducing into an initial first interval of a subterranean formation a viscous fluid comprising a hyposaline aqueous solution of first and second soluble, cationic polymers, wherein the first cationic polymer comprises a hydrophilic base polymer structure and the second cationic polymer comprises a lipophilic base polymer structure (CPLB), and diverting with the viscous fluid a treating fluid from the initial first interval to an initial second interval.

Types of cationic polymers of various embodiments comprise:

(1) Cationic acrylates/methacrylates—Specific examples of such polymers include homopolymers of methacryloyloxyethyl trimethyl ammonium methyl sulfate, methacryloyloxyethyl trimethyl ammonium chloride (METAC), acryloyloxyethyl trimethyl ammonium chloride (AETAC), 3-acrylamidopropyltrimethyl ammonium chloride (also known as APTAC or N,N,N trimethyl-3-[(1-oxo-2-propenyl)amino]-1-propanaminium chloride), and 3-methacrylamidopropyltrimethyl ammonium chloride (also known as MAPTAC or N,N,N-trimethyl-3-[(2-methyl-1-oxo-2-propenyl)amino]-1-propanaminium chloride), and the like, and copolymers of the above monomers with acrylamide and/or methacrylamide;

(2) Poly diallyl dimethyl ammonium chloride (DADMAC) and polydiallyldiethylammonium chloride (DADEAC);

(3) Cationic cellulose derivatives such as quaternized hydroxyethyl cellulose (polyquaternium 10) available from Americhol under the trade designation POLYMER JR, or cationic guar gum such as guar hydroxypropyl trimonium chloride available under the trade designation JAGUAR from Rhone-Poulenc;

(4) Cationic polymers known with their CTFA category name Polyquaternium.

Typical examples of those Polyquaternium 5, Polyquaternium 6, Polyquaternium 7, Polyquaternium 10, Polyquaternium 11, Polyquaternium 14, Polyquaternium 15, Polyquaternium 16, Polyquaternium 22, Polyquaternium 28, Polyquaternium 30, Polyquaternium 36, Polyquaternium 37, Polyquaternium 45 and Polyquaternium 46; and the like.

(5) Amphoteric/zwitterionic polymers, e.g. methacryloyl- and acryloyl-ethyl betaines.

In one embodiment, the first cationic polymer comprises a hydrophilic base polymer structure (CPHB), e.g., polyacrylamide, which remains soluble in water even after hydrolysis of pendant quaternary ammonium groups. In one embodiment the CPHB comprises a cationic polyacrylamide (CPAM). The cationic polyacrylamides are generally prepared by copolymerizing acrylamide with an ethylenically unsaturated cationic monomer. In one embodiment, the cationic polyacrylamides generally have the structure:

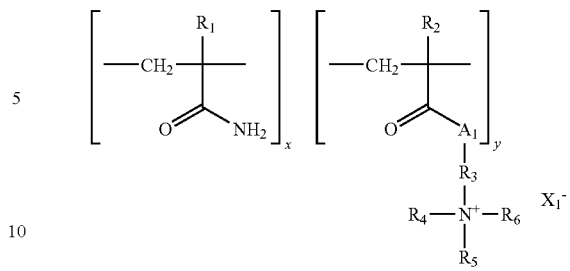

wherein x is a molar fraction of acrylamide or methacrylamide in the copolymer, y is a molar fraction of cationic comonomer in the copolymer, x and y are within the range of from 0 to 1 and $(x+y) \leq 1$, $R_1$ is hydrogen or methyl, $R_2$ is hydrogen or methyl, $A_1$ is —O— or —NH—, $R_3$ is alkylene having from 1 to 3 carbon atoms or hydroxypropylene, $R_4$, $R_5$ and $R_6$ are independently methyl or ethyl and $X_1$ is an anionic counterion, such as, for example, chloride, bromide, methyl sulfate, ethyl sulfate or the like.

In an embodiment, $R_1$ is hydrogen and the cationic monomer is selected from the group consisting of 2-acryloyloxyethyltrimethyl ammonium chloride (also known as AETAC or 2-((1-oxo-2-propenyl)oxy)-N,N,N-trimethyl-ethanaminium chloride), 2-methacryloyloxyethyltrimethyl ammonium chloride (also known as METAC or N,N,N-trimethyl-2-[(1-oxo-2-propenyl)oxy]-ethanaminium chloride,), 3-acrylamidopropyltrimethyl ammonium chloride (also known as APTAC or N,N,N-trimethyl-3-[(1-oxo-2-propenyl)amino]-1-propanaminium chloride), 3-methacrylamidopropyltrimethyl ammonium chloride (also known as MAPTAC or N,N,N-trimethyl-3-[(2-methyl-1-oxo-2-propenyl)amino]-1-propanaminium chloride), and the like, including combinations. When a polymer is referred to as comprising a monomer or comonomer, it is understood that the monomer is present in the polymer in the polymerized form of the monomer or in the derivative from the monomer. However, for ease of reference the phrase comprising the (respective) monomer or the like may be used as shorthand.

The molar ratio of acrylamide (x) to cationic monomer (y) in one embodiment is in the range of 0:1 to 0.95:0.05 with the proviso in an embodiment that the sum of the molar ratios of x and y adds up to 1. The cationic polyacrylamides can be random or block copolymers. Block copolymers can be prepared by a water-in-oil emulsion technique described, for example, in U.S. Pat. No. 5,368,744, the contents of which are herein incorporated by reference. The cationicity of the CPHB, or CPAM, in one embodiment can range from 10 to 70 mole percent, with a range of 20 to 50 percent in another embodiment. The molecular weight of the CPHB, or CPAM, in one embodiment is not critical as long as it remains soluble in water.

The CPHB, or CPAM, can be used in one embodiment in the solution in an amount that is effective as an RPM and/or that is effective to viscosify the solution. In one embodiment, the CPHB, or CPAM, is hydrated in the fluid in concentrations up to about 0.60% by weight of total composition weight, to form the fluid. The range for the embodiments is from about 0.05% to about 0.40% by weight of total composition weight. In various embodiments hereof, the CPHB, or CPAM, can be present in an amount of from about 1.2 to less than about 7.2 g/L (10 to 60 pounds per thousand gallons or ppt) of liquid phase, or from about 1.8 g/L (15 ppt) to less than about 4.8 g/L (40 ppt), from about 1.8 g/L (15 ppt) to about 4.2 g/L (35 ppt), 1.8 g/L (15 ppt) to about 3 g/L (25 ppt), or even from about 2 g/L (17 ppt) to about 2.6 g/L (22 ppt). Generally, the CPHB, or CPAM, can be present in an amount of from about 1.2 g/L (10 ppt) to less than about 6 g/L (50 ppt) of liquid phase, with a lower limit being no less than about 1.2, 1.32, 1.44, 1.56, 1.68, 1.8, 1.92, 2.04, 2.16 or 2.18 g/L (10, 11, 12, 13, 14, 15, 16, 17, 18, or 19 ppt) of the liquid phase, and the upper limit being less than about 7.2 g/L (60 ppt), no greater than 7.07, 6.47, 5.87, 5.27, 4.67, 4.07, 3.6, 3.47, 3.36, 3.24, 3.12, 3, 2.88, 2.76, 2.64, 2.52, or 2.4 g/L (59, 54, 49, 44, 39, 34, 30, 29, 28, 27, 26, 25, 24, 23, 22, 21, or 20 ppt) of the liquid phase. In some embodiments, the CPHB, or CPAM, can be present in an amount of about 2.4 g/L (20 ppt) or 3.6 g/L (30 ppt).

In an embodiment, the second cationic polymer comprises a water-soluble cationic polymer with a lipophilic base polymer structure (CPLB), e.g., polymethacrylate. In another embodiment, the CPLB is a hydrophilic, i.e., water soluble, polymer that is a precursor to a lipophilic, i.e. hydrophobic or water insoluble, polymer, wherein the precursor polymer can be rendered insoluble by a modification reaction that, for example, cleaves pendant hydrophilic moieties from the polymer backbone, or converts the hydrophilic moieties to hydrophobic moieties. In an embodiment, the CPLB has pendant polyquaternary ammonium groups that confer hydrophilicity or solubility on the polymer for fluid preparation and placement in the matrix; however, the quaternary ammonium groups can be hydrolyzed at formation conditions, optionally after placement in the formation matrix, to form a hydrolysate polymer that is insoluble, i.e., the second polymer is rendered hydrophobic/lipophilic or insoluble by the hydrolysis reaction. For example, poly(2-methacryloyloxyethyltrimethyl ammonium methyl sulfate) is water soluble but at neutral pH can form a hydrolysate with methacrylate groups along the polymer backbone that are hydrophobic/lipophilic and tend to make the polymer insoluble in water.

In an embodiment, the CPLB includes a homopolymer or copolymer of at least one cationic monomer according to the formula:

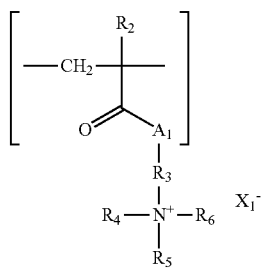

wherein $R_2$ is methyl, $A_1$ is —O— or —NH—, $R_3$ is alkylene having from 1 to 3 carbon atoms or hydroxypropylene, $R_4$, $R_5$ and $R_6$ are independently methyl or ethyl and $X_1$ is an anionic counterion, such as, for example, chloride, bromide, methyl sulfate, ethyl sulfate or the like or a combination thereof. The monomer can be polymerized as a tertiary amine and subsequently quaternized with an acid, or it can be polymerized as a quaternary amine. It is well known that commercially available cationic quaternary amine polymers often contain the corresponding amines (in which $R_4$, $R_5$, and $R_6$ in the quaternary amine and in the corresponding tertiary amine have the same structure). In an embodiment, the acid comprises methyl sulfate, ethyl sulfate or the combination thereof. The CPLB may be added in any effective form including a liquid form, a solid form, or a solution such as an aqueous solution which may contain a cosolvent. The molecular weight of the CPLB is not particularly critical provided it remains soluble in water. As received, commercially available CPLB formulations may also optionally contain one or more members of the group consisting of alcohols, glycols, organic salts, chelating agents, solvents, mutual solvents, organic acids, organic acid salts, inorganic salts, and the like, and mixtures of these members.

In an embodiment, the CPLB can be a copolymer comprising one (or more) ethylenically unsaturated comonomer(s). In an embodiment, the comonomer(s) can be hydrophilic to improve solubility of the polymer, e.g., where the remainder of the polymer base structure is hydrophobic; lipophilic to facilitate hydrophobicity of the hydrolysate where the remainder of the polymer base structure is hydrophilic or hydrophobic; hydrophilic in the polymer and lipophilic in the hydrolysate; and/or lipophilic in the polymer and hydrophilic in the hydrolysate. In embodiments, the CPLB comprises methacrylate copolymer or cationic polymethacrylate.

In one embodiment, the CPLB comprises a homopolymer or copolymer of at least one monomer selected from the group consisting of the acid addition salts of 2-acryloyloxyethyltrimethyl ammonium, 2-methacryloyloxyethyltrimethyl ammonium, 3-acrylamidopropyltrimethyl ammonium, 3-methacrylamidopropyltrimethyl ammonium, 2-acryloyloxyethyltriethyl ammonium, 2-methacryloyloxyethyltriethyl ammonium, 3-acrylamidopropyltriethyl ammonium, 3-methacrylamidopropyltriethyl ammonium and combinations thereof.

In another embodiment, the CPLB comprises a methyl sulfate or ethyl sulfate quaternized polymer of 2-methacryloyloxy ethyltrimethyl amine, 3-methacrylamidopropyltrimethyl amine, 2-methacryloyloxyethyltriethyl amine, 3-methacrylamidopropyltriethyl amine or the like, or a combination thereof. In an embodiment, the CPLB comprises poly((2-methacryloyloxy)ethyltrimethyl ammonium methyl sulfate).

The CPLB may be added in any amount effective in enhancing viscosity properties. In one embodiment, the second cationic polymer is added in an amount from about 0.005% to about 1% by weight of total composition weight, from about 0.01% to about 0.5% by weight of total composition weight. In various embodiments hereof, the CPLB can be present in an amount of from about 1.2 to less than about 7.2 g/L (10 to 60 pounds per thousand gallons or ppt) of liquid phase, or from about 1.8 g/L (15 ppt) to less than about 4.8 g/L (40 ppt), from about 1.8 g/L (15 ppt) to about 4.2 g/L (35 ppt), 1.8 g/L (15 ppt) to about 3 g/L (25 ppt), or even from about 2 g/L (17 ppt) to about 2.6 g/L (22 ppt). Generally, the CPLB can be present in an amount of from about 1.2 g/L (10 ppt) to less than about 6 g/L (50 ppt) of liquid phase, with a lower limit of CPLB being no less than about 1.2, 1.32, 1.44, 1.56, 1.68, 1.8, 1.92, 2.04, 2.16 or 2.18 g/L (10, 11, 12, 13, 14, 15, 16, 17, 18, or 19 ppt) of the liquid phase, and the upper limit being less than about 7.2 g/L (60 ppt), no greater than 7.07, 6.47, 5.87, 5.27, 4.67, 4.07, 3.6, 3.47, 3.36, 3.24, 3.12, 3, 2.88, 2.76, 2.64, 2.52, or 2.4 g/L (59, 54, 49, 44, 39, 34, 30, 29, 28, 27, 26, 25, 24, 23, 22, 21, or 20 ppt) of the liquid phase. In some embodiments, the CPLB can be present in an amount of about 2.4 g/L (20 ppt) or 3.6 g/L (30 ppt).

In one embodiment, the viscous fluid can also comprise an organic quaternary amine salt. Exemplary quaternary amine salts are disclosed in U.S. Pat. No. 5,979,557 and U.S. Pat. No. 6,435,277 which are hereby incorporated herein by reference. Examples of suitable quaternary amines include cationic surfactants having the structure:

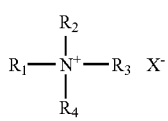

which can also be written as $R_1N^+(R_2)(R_3)(R_4) \, X^-$, in which $R_1$ has from about 8 to about 30 carbon atoms in an embodiment, or from about 14 to about 26 carbon atoms in another embodiment, and may be branched or straight chained, aromatic, saturated or unsaturated, and may contain a carbonyl, an amide, a retroamide, an imide, a urea, or an amine; $R_2$, $R_3$, and $R_4$ are each independently a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion, for example, a halide selected from chloride, bromide or fluoride. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms. In one embodiment, the quaternary amine salt may include alkyl ethoxylated quaternary methyl ammonium chloride salts represented by the formula:

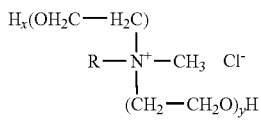

The quaternary amine salts may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received, commercially available quaternary amine salt concentrate formulations may also optionally contain one or more members of the group consisting of alcohols, glycols, organic salts, chelating agents, solvents, mutual solvents, organic acids, organic acid salts, inorganic salts, oligomers, polymers, co-polymers, and mixtures of these members.

Another embodiment of the quaternary amine is erucyl bis(2-hydroxyethyl) methyl ammonium chloride, also known as (Z)-13 docosenyl-N—N-bis(2-hydroxyethyl) methyl ammonium chloride. It is commonly obtained from manufacturers as a mixture containing about 60 weight percent quaternary amine in a mixture of isopropanol, ethylene glycol, and water. Other embodiments of quaternary amines that may be used alone or in combination with another quaternary amine include: erucyl trimethyl ammonium chloride; N-methyl-N,N-bis(2-hydroxyethyl) rapeseed ammonium chloride; oleyl methyl bis(hydroxyethyl) ammonium chloride; erucylamidopropyltrimethylamine chloride, octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; and cetylamino, N-octadecyl pyridinium chloride.

In some embodiments, the quaternary amine salt is a cationic, zwitterionic or amphoteric surfactant containing a quaternary ammonium group in its chemical structure, referred to in the art as amine functional surfactants. A particularly useful surfactant is the alkyl amine contained in the surfactant solution AQUAT 944® (available from Baker Petrolite of Sugar Land, Tex.).

Additional embodiments of the quaternary amine salts include, but are not necessarily limited to, di-(hydrogenated tallowalkyl) dimethyl ammonium chloride, cocoalkyltrimethyl ammonium chloride, benzyldimethylcocoalkyl ammonium chloride, benzylbis(2-hydroxyethyl)cocoalkyl ammonium chloride, alkyl (e.g., $C_{12}$-$C_{16}$) dimethyl benzyl ammonium chloride, and coco benzyl ammonium chloride ethoxylate. A particular useful quaternary amine salt is coco-bis(2-hydroxyethyl)methyl ammonium chloride.

In one embodiment, the amine salt is added in an amount from about 0.005% to about 1% by weight of total composition weight, from about 0.01% to about 0.5% by weight of total composition weight. The amine salt may be added in any effective form including a liquid form, a solid form, or a solution such as an aqueous salt solution.

As used herein, the term "hyposaline" refers not only to aqueous saline solutions containing less inorganic salt than seawater, e.g. 5 to 25 weight percent of the salinity of ocean water, but also is intended to include water with lower or no salinity, e.g., brackish water and freshwater that may be essentially free of any inorganic salt, with the exception of course of the acid addition salts from the cationic moieties of the first and second cationic polymers and the optional quaternary amine salts mentioned above and other organic salts that may be present. An organic salt is understood to be a salt in which either the cation or anion is organic; in inorganic salts both the cation and anion are inorganic.

In one embodiment the aqueous solution in the fluid comprises an inorganic saline content less than 0.3 percent by weight of the solution (3000 ppm), or less than 0.05 percent by weight of the solution (500 ppm). In an embodiment, the fluid comprises freshwater to which no inorganic salts have been deliberately added. In another embodiment, the aqueous medium has a low brine or salt concentration to provide a low conductivity mixture. In one embodiment, the aqueous medium has a low conductivity such as less than 10 mS/cm, less than 5 mS/cm, or less than 2 mS/cm. Conductivity is readily measured with a conductivity meter.

In another embodiment, the aqueous solution may comprise up to 500 ppm of an inorganic salt such as, for example, an alkali metal halide, for example, potassium chloride, sodium chloride, or the like, or inorganic divalent salts including calcium halides, calcium chloride or calcium bromide. Sodium bromide, potassium bromide, or cesium bromide may also be used. The salt may be added in a distinct addition step, or it can be introduced indirectly from other fluids used in the wellbore, e.g., a drilling, workover or completion fluid.

In another embodiment, the fluid may include a hydrated polysaccharide. In one embodiment, the polysaccharide comprises galactomannan gums, including guars and derived guars. Nonlimiting examples include guar gum, guar gum derivatives, locust bean gum, karaya gum, and the like.

Without limitation, useful polysaccharides have molecular weights in the range of about 200,000 to about 3,000,000. Galactomannans represent an embodiment of polysaccharides having adjacent cis-hydroxyl groups. The term galactomannans refers in various aspects to natural occurring polysaccharides derived from various endosperms of seeds. They are primarily composed of D-mannose and D-galactose units. They generally have similar physical properties, such as being soluble in water to form thick highly viscous solutions which can be gelled (crosslinked) by the addition of such inorganic salts as borax, although in one embodiment the polysaccharide is used in a so-called "linear" form, i.e. uncrosslinked. Examples of some plants producing seeds containing galactomannan gums include tara, huisache, locust bean, palo verde, flame tree, guar bean plant, honey locust, lucerne, Kentucky coffee bean, Japanese pagoda tree, indigo, jenna, rattlehox, clover, fenugreek seeds, soy bean hulls and the like. The gum is provided in a convenient particulate form. Of these polysaccharides, anionic modified guar and its derivatives are preferred. As a galactomannan, guar gum is a branched copolymer containing a mannose backbone with galactose branches.

The polysaccharide is added in concentrations up to about 0.60% by weight of total composition weight, to form the fluid. The range for the embodiments is from about 0.05% to about 0.40% by weight of total composition weight. In various embodiments hereof, the polysaccharide can be present in an amount of from about 1.2 to less than about 7.2 g/L (10 to 60 pounds per thousand gallons or ppt) of liquid phase, or from about 1.8 g/L (15 ppt) to less than about 4.8 g/L (40 ppt), from about 1.8 g/L (15 ppt) to about 4.2 g/L (35 ppt), 1.8 g/L (15 ppt) to about 3 g/L (25 ppt), or even from about 2 g/L (17 ppt) to about 2.6 g/L (22 ppt). Generally, the polysaccharide can be present in an amount of from about 1.2 g/L (10 ppt) to less than about 6 g/L (50 ppt) of liquid phase, with a lower limit of polymer being no less than about 1.2, 1.32, 1.44, 1.56, 1.68, 1.8, 1.92, 2.04, 2.16 or 2.18 g/L (10, 11, 12, 13, 14, 15, 16, 17, 18, or 19 ppt) of the liquid phase, and the upper limit being less than about 7.2 g/L (60 ppt), no greater than 7.07, 6.47, 5.87, 5.27, 4.67, 4.07, 3.6, 3.47, 3.36, 3.24, 3.12, 3, 2.88, 2.76, 2.64, 2.52, or 2.4 g/L (59, 54, 49, 44, 39, 34, 30, 29, 28, 27, 26, 25, 24, 23, 22, 21, or 20 ppt) of the liquid phase. In some embodiments, the polysaccharide can be present in an amount of about 2.4 g/L (20 ppt).

The RPM treatment fluids incorporating a CPHB, or CPAM, and a CPLB, in one embodiment, may have any suitable viscosity, for example a viscosity value of about 5 mPa·s or greater at a shear rate of about $100\ s^{-1}$ at treatment temperature, about 10 mPa·s or greater at a shear rate of about $100\ s^{-1}$, about 20 mPa·s or greater, or above 40 mPa·s in some instances. In one embodiment, the viscosity is selected based on the permeability of the formation to be treated, e.g., more permeable formations generally requiring a higher RPM diverter fluid viscosity. For example, a formation having a permeability of 1 mD may require only a 5 or 10 mPa·s RPM diverter fluid, whereas a formation having a permeability of 100 mD may require a diverter fluid with a viscosity of 40 mPa·s, in embodiments. Further, the viscosity of the RPM diverter fluid may be changed (e.g., reduced) from one stage to the next, or even during the same stage, as the permeability of the formation or zone being treated changes (reduces) during the progress of the treatment.

Fluid embodiments may further contain other additives and chemicals that are known to be commonly used in oilfield applications by those skilled in the art. These include, but are not necessarily limited to, materials such as surfactants in addition to those mentioned hereinabove, crosslinkers, breakers, breaker aids, oxygen scavengers, alcohol stabilizers, scale inhibitors, corrosion inhibitors, fluid-loss additives, bactericides and biocides, and the like.

In embodiments, the viscous CPHB/CPLB fluid is used in a diversion method comprising one or more stages of the viscous relative permeability modifier (RPM) fluid alternated with one or more stages of another treatment fluid. The viscous RPM fluid can be injected first or subsequent to an initial injection of the other treatment or pretreatment fluid. In a matrix acidizing diversion method according to an embodiment, the viscous RPM treatment fluid containing CPHB, or CPAM, and CPLB, and optionally containing polysaccharide such as guar, is used to optimize treatment with a low viscosity matrix acidizing treatment fluid.

The method is used in an embodiment to treat a formation with an interval height of more than about 6 m (20 ft) with known variations in permeability across the height of the interval to be treated and/or with known intervals with high water saturation. If desired, a solvent can be pumped initially for near-wellbore cleanup. The treatment then proceeds to alternating injection stages of the viscous RPM treatment fluid and another treatment fluid, starting with one or the other, depending on the formation characteristics. The other treatment fluid according to various embodiments can be a low viscosity treatment fluid, i.e., having a viscosity less than that of the viscous RPM stage at formation conditions, or having a viscosity at 100 l/s and 66° C. less than 20 mPa·s, less than 10 mPa·s, or less than 5 mPa·s. The low viscosity treatment fluid may be a matrix acidizing fluid, a low viscosity RPM treatment fluid, or the like, or a combination thereof in the same or different low viscosity stages. Exemplary treatment fluids include regular mud acid (HCl and HF acid mixtures). Additional treatment fluids are described in U.S. Pat. No. 5,203,413 and U.S. Pat. No. 6,435,277 which are hereby incorporated herein by reference in their entirety to the extent they are not inconsistent with the present disclosure.

In one embodiment, an even number of alternate stages are injected, i.e., if the low viscosity fluid is injected first then the final treatment stage will be with the high viscosity RPM fluid, and vice versa if the RPM fluid is first the low viscosity fluid is last. In an alternate embodiment, an odd number of alternate stages are injected, e.g., injection of the low viscosity fluid before the initial high viscosity RPM and following the last high viscosity RPM stage, or injection of high viscosity RPM before the initial low viscosity fluid and following the last low viscosity fluid stage. Following the final treatment fluid stage, in one embodiment the treating fluid is displaced from the face of the formation at the wellbore, into the formation, the well may or may not be shut in for a period of time, treating fluids are flowed back to clean up the well and the well is put on production.

For the low viscosity treatment fluid stages, a volume of fluid is injected which is sufficient to treat about 6 m (20 ft) of the interval. This may involve pumping a sequence of one or more of pre-flush, weak acid and/or strong acid stages, in the case of acidizing, as known by those skilled in the art. In the case of low viscosity RPM treatment, injection may involve injecting one or more of pre-flush, RPM, RPM precursor and/or RPM activating stages, as is known by those skilled in the art.

In one embodiment, the volume of each viscous RPM treatment fluid stage is calculated based on a treatment rate of about 250 L per meter (20 gal/ft) of the interval with high water saturation. In another embodiment, the volume of the viscous RPM fluid stage is adjusted depending on the extent of high water saturation over the total interval being treated as well as the porosity. For example, in one embodiment where less than 30% of the total interval has high water saturation and the porosity is between 10 and 30%, the per-stage volume can be about 125 L per meter of interval plus 25 L/m for every percent porosity in excess of 10%, i.e., Vol (L/m)=125+(% Porosity−10)*25. As an alternate example, where more than 30% of the total interval has high water saturation and the porosity is between 10 and 30%, the per-stage volume can be about 125 L per meter of interval plus 12.5 L/m for every percent porosity in excess of 10%, i.e., Vol (L/m)=125+(% Porosity−10)*12.5.

In another embodiment, the viscosity of the high viscosity RPM fluid is adjusted as a function of the formation permeability to provide sufficient pressure drop. In an embodiment, the viscosity can be adjusted by varying the concentration of the CPAM, between 1.2 and 3.6 g/L (10 and 30 ppt), the guar, between 1.2 and 3.6 g/L (10 and 30 ppt), and/or the CPLB, between 0.6 and 1.8 g/L (5 and 15 ppt). For example, in one instance an RPM treatment fluid having a viscosity of about 10 mPa·s at 100 l/s and 66° C. is used to treat a formation with an effective permeability to water of 1 mD, whereas an RPM treatment fluid having a viscosity of about 100 mPa·s at 100 l/s and 66° C. is used to treat a formation with an effective permeability to water of 100 mD. In another embodiment, the CPLB is maintained at a uniform concentration effective for shale stabilization, between 0.6 and 1.8 g/L (5 and 15 ppt); CPAM is used: (1) at 2.4 g/L for formations with permeability of 20-1000 mD and temperature of 26-82° C., or 20-300 mD and 82-115° C., (2) at 3 g/L for >1000 mD/26-65° C., 1000-1500 mD/65-82° C., or 300-1000 mD/82-115° C.; and (3) at 3.6 g/L for >1500 mD/65-82° C., or >1000 mD/82-115° C.; and guar is used at from 0 g/L for formations with permeability of 20-100 mD and temperature of 26-48° C. up to 3.6 g/L for formations >1000 mD/65-115° C., generally using higher amounts of guar to account for the tendency of temperature to decrease viscosity (more guar required) and the permeability to require higher viscosity (more guar) to block relatively larger pore throats.

The embodiment may be a fluid, comprising a viscous hyposaline aqueous solution of first and second cationic polymers comprising quaternized ammonium groups, wherein the first cationic polymer comprises a hydrophilic base polymer structure and the second cationic polymer comprises a lipophilic base polymer structure. The first cationic polymer may comprise cationic polyacrylamide. The cationic polyacrylamide may comprise a copolymer of acrylamide and a cationic comonomer wherein the copolymer comprises a cationicity from about 10 to about 70 mole percent. The cationic comonomer may be selected from the group consisting of the acid addition salts of 2-acryloyloxyethyltrimethyl ammonium, 2-methacryloyloxyethyltrimethyl ammonium, 3-acrylamidopropyltrimethyl ammonium, 3-methacrylamidopropyltrimethyl ammonium, 2-acryloyloxyethyltriethyl ammonium, 2-methacryloyloxyethyltriethyl ammonium, 3-acrylamidopropyltriethyl ammonium, 3-methacrylamidopropyltriethyl ammonium and combinations thereof. The cationic comonomer may be selected from 2-acryloyloxyethyltrimethyl ammonium chloride (AETAC), 2-methacryloyloxyethyltrimethyl ammonium chloride (METAC), 3-acrylamidopropyltrimethyl ammonium chloride (APTAC), 3-methacrylamidopropyltrimethyl ammonium chloride (MAPTAC), and combinations thereof. The first cationic polymer may comprise a copolymer of 50 to 80 mole percent acrylamide and 50 to 20 mole percent 2 methacryloyloxyethyltrimethyl ammonium chloride (METAC). The second cationic polymer may be hydrolyzable to form a hydrolysis reaction product comprising a polymeric hydrolysate insoluble in the aqueous solution. The second cationic polymer may comprise a homopolymer or copolymer of at least one monomer selected from the group consisting of the acid addition salts of 2-acryloyloxyethyltrimethyl ammonium, 2-methacryloyloxyethyltrimethyl ammonium, 3-acrylamidopropyltrimethyl ammonium, 3-methacrylamidopropyltrimethyl ammonium, 2-acryloyloxyethyltriethyl ammonium, 2-methacryloyloxyethyltriethyl ammonium, 3-acrylamidopropyltriethyl ammonium, 3-methacrylamidopropyltriethyl ammonium and combinations thereof. The acid may comprise methyl sulfate anion, ethyl sulfate anion, or a combination thereof. The lipophilic base polymer structure of the second cationic polymer may comprise polymethacrylate. The second cationic polymer may comprise a methyl sulfate or ethyl sulfate quaternized polymer of a monomer selected from the group consisting of 2-methacryloyloxyethyltrimethyl amine, 3-methacrylamidopropyltrimethyl amine, 2-methacryloyloxyethyltriethyl amine, and 3-methacrylamidopropyltriethyl amine and combinations thereof. The second cationic polymer may comprise poly((2-methacryloyloxy)ethyltrimethyl ammonium methyl sulfate). The fluid may further comprise a hydrated polysaccharide, galactomannan, or guar. The fluid may further comprise an inorganic saline content less than 0.3 percent by weight of the solution, less than 0.05 percent by weight of the solution.

EXAMPLES

In the following examples, the viscous fluid is prepared by hydrating varying concentrations of a cationic polyacrylamide (CPAM) with or without a cationic polymer with a hydrophilic base polymer structure (CPLB) and with or without guar in fresh water. The CPAM in the examples was poly-acrylamide-co-2-methacryloyloxyethyltrimethyl ammonium chloride (METAC). The cationic polymer with a lipophilic base structure was a polymer of 2-methacryloyloxyethyltrimethyl ammonium methyl sulfate in a 16.2 wt % aqueous solution containing 19.2 wt % methanol and 1 wt % sodium formate.

In the following examples, viscosity was determined using a Chandler Engineering Model 5550 rheometer according to the procedures described in the API Recommended Practices #39 and ISO 13503-1. Relative permeabilities were calculated according to the well-known Johnson, Bossier and Naumann method, also referred to as the JBN method; see Johnson et al., *Calculation of Relative Permeability from Displacement Experiments*, SPE 1023.

Example 1

Synergistic effect of CPAM/CPLB/guar on fluid viscosity. Fluids were prepared with various combinations of guar, CPLB and/or hydrated CPAM and tested for viscosity at 100/s and 63° C., as shown in Table 1.

TABLE 1

Viscous CPAM Fluids

| Fluid | CPAM, g/L | CPLB, g/L | Guar, g/L | Viscosity at 100 1/s // 63° C., mPa · s | FIG. |
|-------|-----------|-----------|-----------|------------------------------------------|------|
| F1    | 3.0       | 0         | 0         | 33                                       | 1    |
| F2    | 3.0       | 0.8       | 0         | 32                                       | 1    |
| F3    | 0         | 0         | 3.0       | 32                                       | 2    |
| F4    | 0         | 0.8       | 3.0       | 33                                       | 2    |

TABLE 1-continued

Viscous CPAM Fluids

| Fluid | CPAM, g/L | CPLB, g/L | Guar, g/L | Viscosity at 100 1/s // 63° C., mPa·s | FIG. |
|---|---|---|---|---|---|
| F5 | 3.0 | 0 | 2.4 | 20 | 3 |
| F6 | 3.0 | 1.6 | 1.8 | 100 | 3 |

Figure 2:
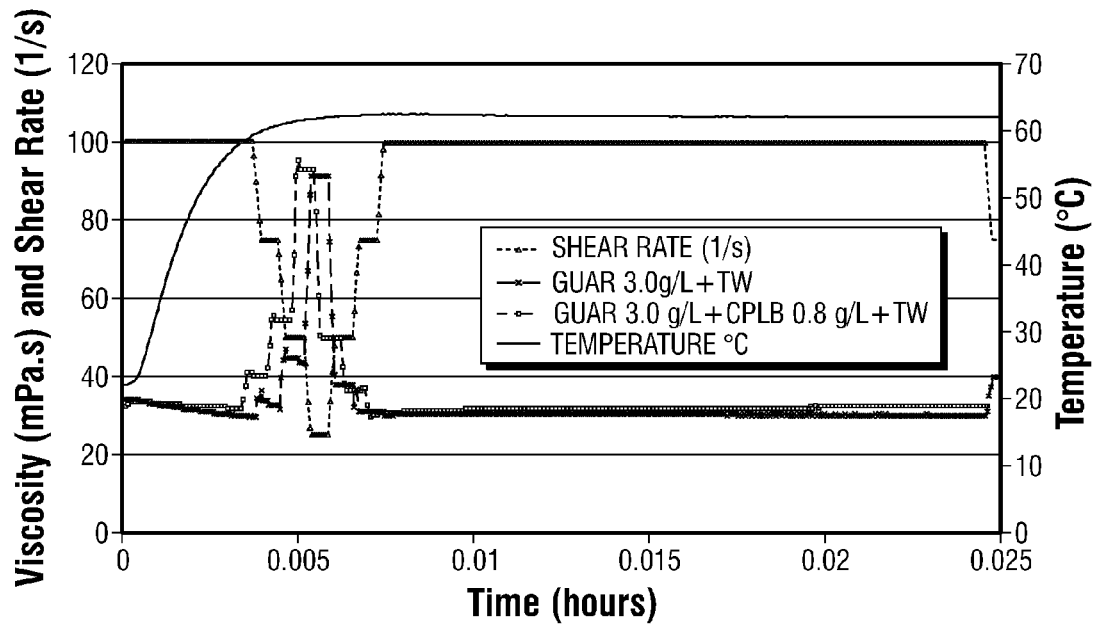
FIG. 2 compares the viscosity profiles of fluids prepared by hydrating 3 g/L (25 ppt) guar in tap water with and without 0.8 g/L CPLB, according to an embodiment as described in Example 1.
Figure 3:
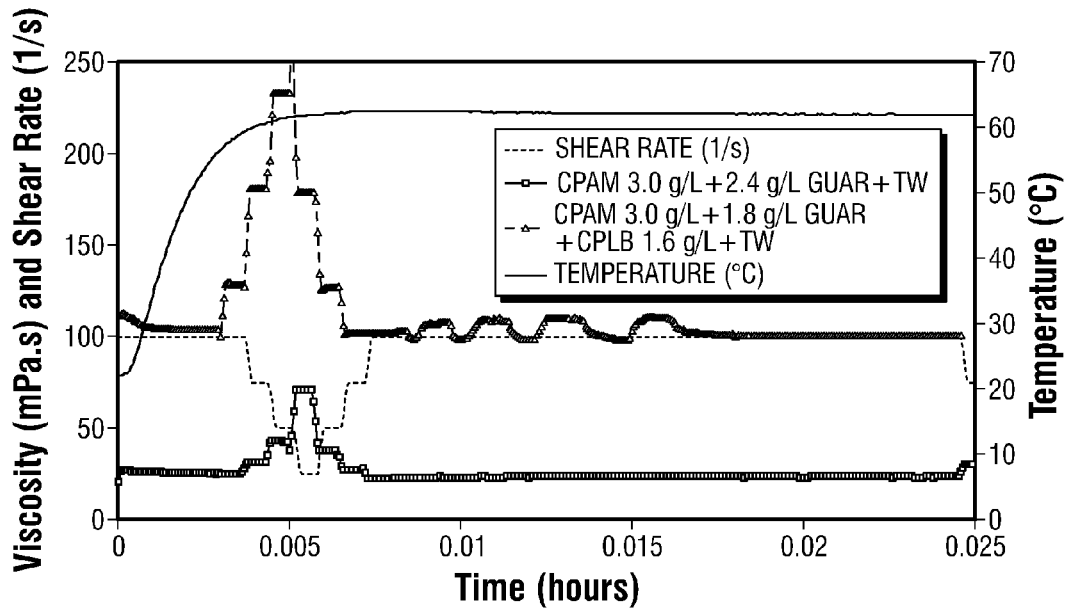
FIG. 3 compares the viscosity profiles of fluids prepared by hydrating in tap water 3 g/L (25 ppt) CPAM and either 2.4 g/L (20 ppt) guar/no CPLB or 1.8 g/L (15 ppt) guar/1.6 g/L CPLB, according to an embodiment as described in Example 1.

The rheology curves illustrated in FIGS. 1 to 3 show that the fluid prepared with guar, CPAM and CPLB had an unexpectedly higher viscosity than similar fluids prepared with only one or two of the components. In FIG. 1, the addition of CPLB does not influence the viscosity of the final solution of the cationic polyacrylamide (CPAM) in tap water. In FIG. 2, the addition of CPLB does not influence the viscosity of the final solution of the guar polymer in tap water. Fluids prepared with CPAM only, CPAM and CPLB, guar only, or guar and CPLB, had essentially the same viscosity, while the fluid prepared with CPAM and guar had a slightly decreased viscosity. In FIG. 3, however, the addition of the CPLB in the presence of CPAM and guar polymer in tap water results in a significant increase in the viscosity of the fluid.

Example 2

Figure 4:
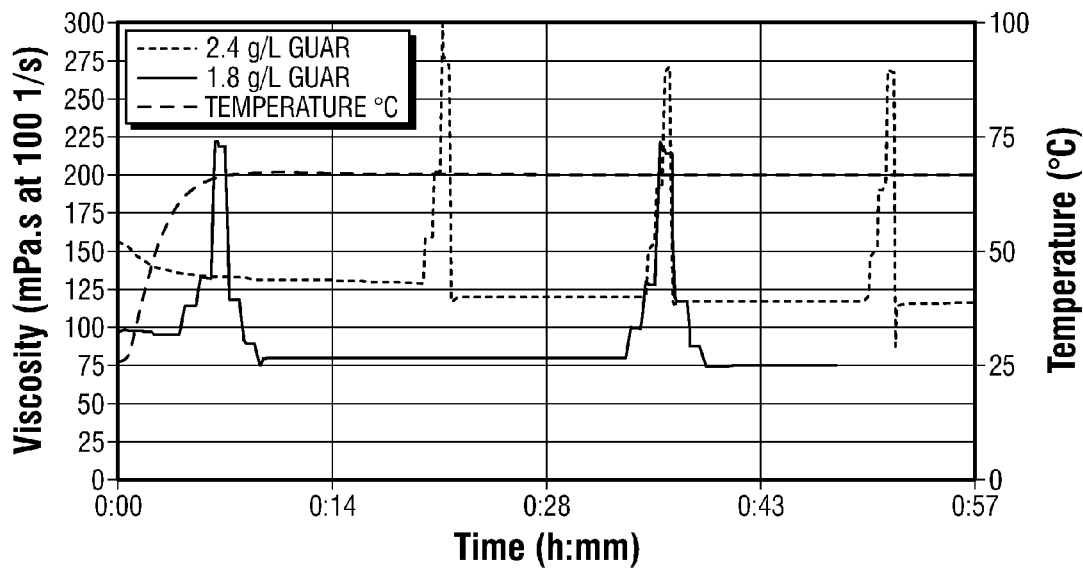
FIG. 4 compares the viscosity profiles of fluids prepared in fresh water with 2.4 g/L (20 ppt) CPAM, 1.6 g/L (10 gpt) CPLB, and either 1.8 g/L (15 ppt) or 2.4 g/L (20 ppt) guar, according to embodiments as described in Example 2.
Figure 5:
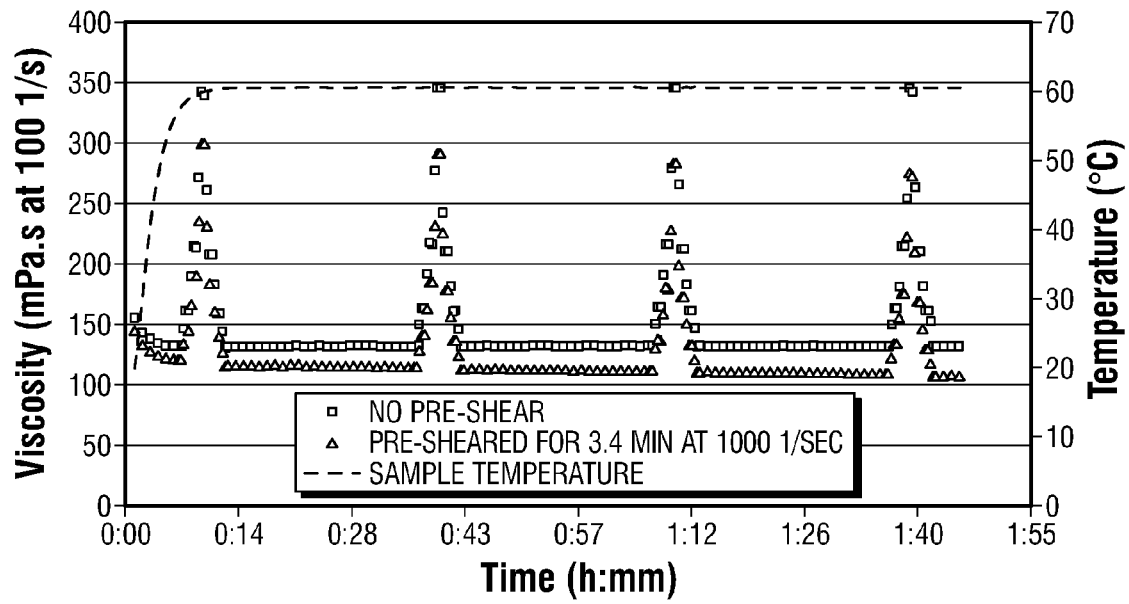
FIG. 5 compares the viscosity profiles of freshwater CPAM/CPLB/guar fluids prepared with or without pre-shear, according to embodiments as described in Example 2.

Shear stability and effect of guar concentration on viscosity of CPAM/CPLB fluids. Fluids were prepared by hydrating 2.4 g/L (20 ppt) CPAM and 0.8 g/L CPLB with (1) 1.8 g/L (15 ppt) guar and (2) 2.4 g/L (20 ppt) guar. The rheology curves are illustrated in FIG. 4 and show that the fluid viscosity can be adjusted by changing the guar concentration, e.g., a higher guar concentration leads to a higher viscosity. In this embodiment in a fluid containing CPAM, guar and CPLB, the final viscosity of the fluid can be adjusted by adjusting the concentration of guar polymer present in the solution. The viscosity of the fluid can be adjusted by changing the concentration of either or both CPAM and guar, as needed depending on the permeability of the formation to be treated. Similarly, fluids prepared with 2.4 g/L CPAM, 2.4 g/L guar and 1.6 g/L CPLB, with and without pre-shearing for 3.4 minutes at 1000 l/s, exhibited only a marginal loss of viscosity as seen in FIG. 5, indicating that shear history has only a marginal effect on viscosity and suggesting that the polymer is linear, i.e., uncrosslinked. In this embodiment, the increased viscosity due to the addition of CPLB to a solution of CPAM and guar is insensitive to shear and therefore can be considered permanent or irreversible. Further, the fluid can be used between 38 and 121° C. (100 and 250° F.), since temperature appears to have only a limited effect on the fluid viscosity.

Example 3

Figure 6:
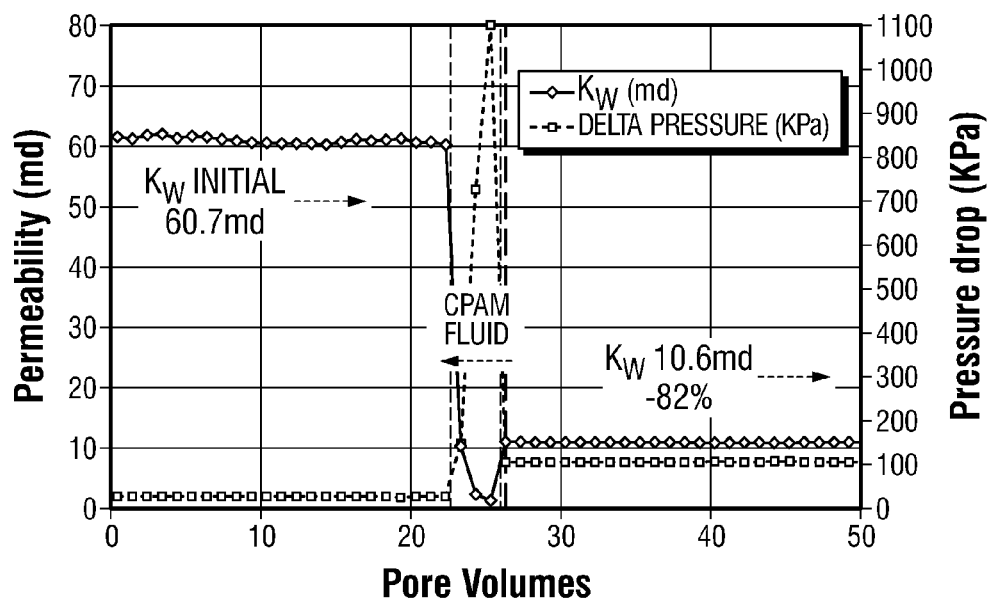
FIG. 6 shows a permeability/pressure plot for a core illustrating the changes in injection pressure and effective permeability to water before and after injecting viscous CPAM/CPLB/guar fluid, according to an embodiment as described in Example 3.

Effect of injecting CPAM fluid into a water-saturated core. In this example, an RPM treatment fluid made by hydrating 3.0 g/L (25 ppt) CPAM+1.8 g/L Guar+1.6 g/L CPLB in tap water was injected into a water-saturated Berea sandstone core at 1 ml/min. The permeability/pressure plot is presented in FIG. 6. The data in FIG. 6 show that the overall permeability of the treated core declined, but that the permeability to water declined by a much larger factor, 82% reduction in the water permeability whereas the oil permeability was about the same, indicating that the oil/water production ratio is improved by treatment with the RPM fluid. Furthermore, the injection pressure increased by about 1.0 MPa (150 psi) when injecting the viscous RPM fluid; thus, in a formation with intervals or zones of different permeability the later fluid stages are diverted to other zones in which the injectivity is higher, i.e., zones that require a lower DP relative to the RPM-treated zone to be injected at the same flow rate. This means that in the case of formations in which there are zones producing water, i.e., water saturated zones, the use of the viscous RPM fluid both (1) diverts subsequently injected treating fluids away from these intervals to selectively treat intervals with higher oil saturations and (2) reduces the water production from these intervals after the treatment. The net effect is an increase in oil production and a decrease in water production. In this embodiment, the reduction in the effective permeability to water after injecting (treating) with a viscous CPAM/CPLB/guar fluid is similar to that seen when injecting a low viscosity CPAM fluid as a relative permeability modifier (see FIG. 7).

Example 4

Figure 7:
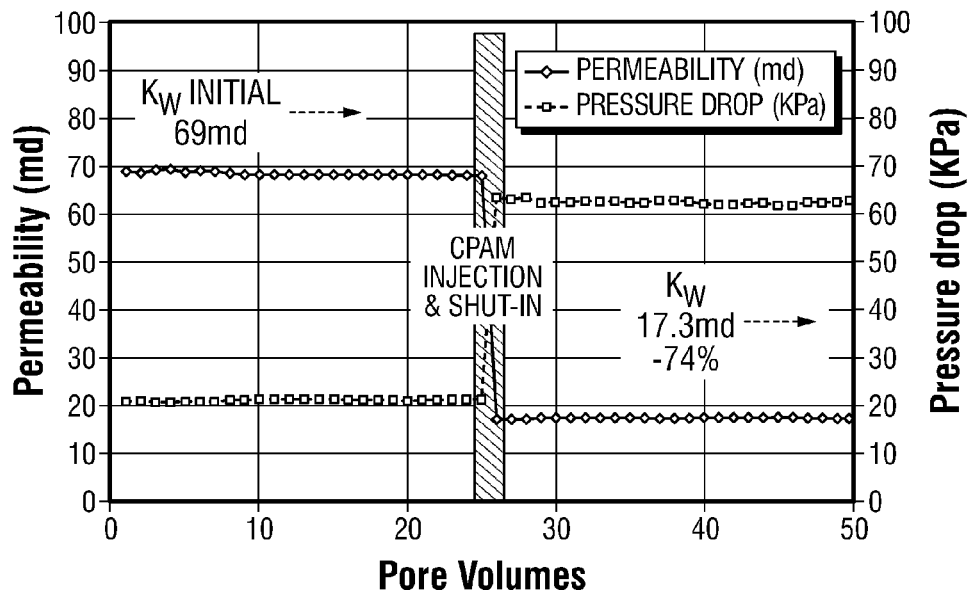
FIG. 7 shows a permeability/pressure plot for a core illustrating the changes in injection pressure and effective permeability to water before and after injecting low viscosity CPAM fluid, according to an embodiment as described in Example 4.

Effect of injecting CPAM treatment fluid into a water-saturated core. In this example, an RPM treatment fluid made by hydrating 3.0 g/L (25 ppt) CPAM in tap water was injected into a water-saturated Berea sandstone core at 1 ml/min as in Example 3. The permeability/pressure plot is presented in FIG. 7. The data in FIG. 7 show that the overall permeability of the treated core declined, but that the permeability to water declined by a much larger factor, 74% reduction in the water permeability whereas the oil permeability was about the same, indicating that the oil/water production ratio is improved by treatment with the RPM fluid. The injection of the CPAM fluid results in a substantial and disproportionate reduction in the effective permeability to water. This means that in the case of formations in which there are zones producing water, i.e., water saturated zones, the low viscosity CPAM fluid can be used to reduce the water production from an interval treated before or after a treatment stage with a high viscosity RPM fluid. The net effect is an increase in oil production and a decrease in water production.

Example 5

Permeability changes from viscosified RPM fluid treatment. A fluid was prepared by hydrating 3 g/L (25 ppt) CPAM and 1.8 g/L (15 ppt) guar with 1.6 g/L CPLB. The fluid was then injected into a Berea sandstone core using the following procedure: (1) Measured absolute permeability of the core to water in the producing directions at a rate of 1 ml/min; (2) Measured effective permeability of the core to oil in the producing direction using a volume sufficient to stabilize the differential pressure (DP) across the core, i.e., 20 pore volumes (PV) at 1 ml/min, following which, measured residual saturation to water; (3) Measured effective permeability of the core to water in the producing direction, using an injected volume sufficient to stabilize the DP across the core, i.e., 20 PV at 1 ml/min, following which measured the residual saturation of oil and determined the relative permeability by the JBN method; (5) Injected 5 PV of the viscous RPM treatment fluid at 1 ml/min; (7) Measured effective permeability to oil at Swr in the production direction and compared with value established in step 2; and (11) Measured the effective permeability to water at Sor, determined the relative permeability values using the JBN method, and compared the results with those obtained in step 3.

Figure 8:
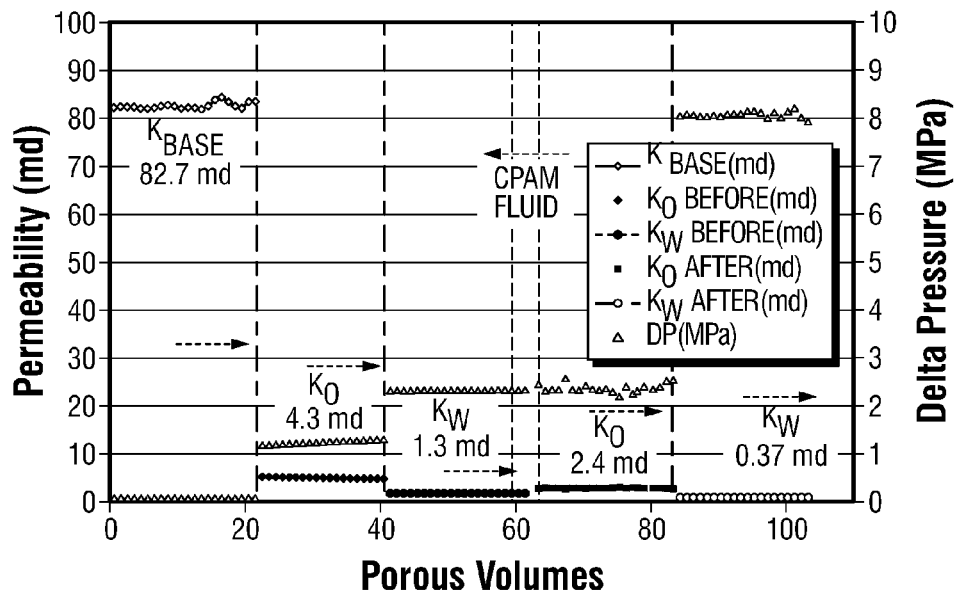
FIG. 8 shows a permeability/pressure plot for a core illustrating the changes in injection pressure and effective permeability to oil and water before and after injecting viscous CPAM/CPLB/guar fluid, according to an embodiment as described in Example 5.

The permeability/pressure plot vs. pore volumes is illustrated in FIG. 8 and shows the changes in effective permeability to oil and water after injecting the viscous RPM treatment fluid into the core. In this embodiment, the injection of the viscous CPAM/CPLB/guar fluid results in a negligible decrease in the effective permeability to oil and a very substantial decrease in the effective permeability to water. The oil-water residual saturation and relative permeability before and after RPM fluid treatment are tabulated in Table 2 below.

TABLE 2

Oil-Water Saturation and Permeability Following RPM Treatment

| Property | Before | After |
|---|---|---|
| Irreducible Water Saturation, Swr (%) | 25 | 32 |
| Oil relative permeability, Kro, at Swr | 0.12 | 0.08 |
| Residual Oil Saturation to Water, Sor (%) | 42 | 39 |
| Water relative permeability, Krw, at Sor | 0.59 | 0.49 |

The data in FIG. 8 and Table 2 show that the overall permeability of the treated core declined, but that the permeability to water declined by a much larger factor, 71% reduction in the water permeability compared to a 45% reduction in the oil permeability, indicating that the oil/water production ratio is improved by treatment with the RPM fluid. Furthermore, the injection pressure increased by about 1.7 MPa (250 psi) when injecting the viscous RPM fluid; thus, in a formation with intervals or zones of different permeability the later fluid stages are diverted to other zones in which the injectivity is higher, i.e., zones that require a lower DP relative to the RPM-treated zone to be injected at the same flow rate. This means that in the case of formations in which there are zones producing water, i.e., water saturated zones, the use of the viscous RPM fluid both (1) diverts subsequently injected treating fluids away from these intervals to selectively treat intervals with higher oil saturations and (2) reduces the water production from these intervals after the treatment. The net effect is an increase in oil production and a decrease in water production.

Example 6

Permeability changes from RPM treatment fluid as a diverter during a matrix stimulation treatment. This example investigated the effects of the viscous RPM treatment fluid as a diverter during a matrix stimulation treatment, with fluids injected into the matrix at a pressure below the fracture gradient. The testing involved establishing a baseline permeability to both oil and water and then injecting a train of fluids into the core while measuring the differences in the injection pressure, after which the permeability to both oil and water was again measured. An increase in the injection pressure at a constant flow rate (1 ml/min in this example) when injecting regular mud acid (RMA) at 6:2 HCl:HF after injecting the viscous RPM fluid indicates an effective decrease in the relative permeability to acid and so a tendency for the acid to be diverted away from the interval in which the viscous RPM fluid was injected.

A Bandera core was selected for testing because previous testing had shown that acid did not stimulate the matrix, but only had the effect of increasing the critical velocity with respect to fines migration. The same fluid as in Example 3 was used (3 g/L (25 ppt) CPAM, 1.8 g/L (15 ppt) guar, 1.6 g/L CPLB). The test sequence was as follows: (1) Measured absolute permeability of the core to water in the injection and producing directions at a rate of 1 ml/min; (2) Measured effective permeability of the core to oil in the producing direction using a volume sufficient to stabilize the differential pressure (DP) across the core, i.e., 20 pore volumes (PV) at 1 ml/min, following which, measured residual saturation to water; (3) Measured effective permeability of the core to water in the producing direction, using an injected volume sufficient to stabilize the DP across the core, i.e., 30 PV at 1 ml/min, following which measured the residual saturation of oil and determined the relative permeability by the JBN method; (4) Injected oil until reaching the irreducible water saturation (Swr) 1 ml/min; (5) Injected 10 PV of the viscous RPM treatment fluid at 1 ml/min; (6) Injected 8 PV of stimulation fluid (low viscosity RMA) at 1 ml/min while measuring DP; (7) Compared the DP in steps 5 and 6 (stimulation fluid injection after RPM diverter stage); (8) Shut in the core for 12 hours with treatment fluid in place; (9) Measured effective permeability to oil at Swr in the production direction and compared with value established in step 2; and (10) Measured the effective permeability to water at Sor, determined the relative permeability values using the JBN method and compared the results with those obtained in step 3.

Figure 9:
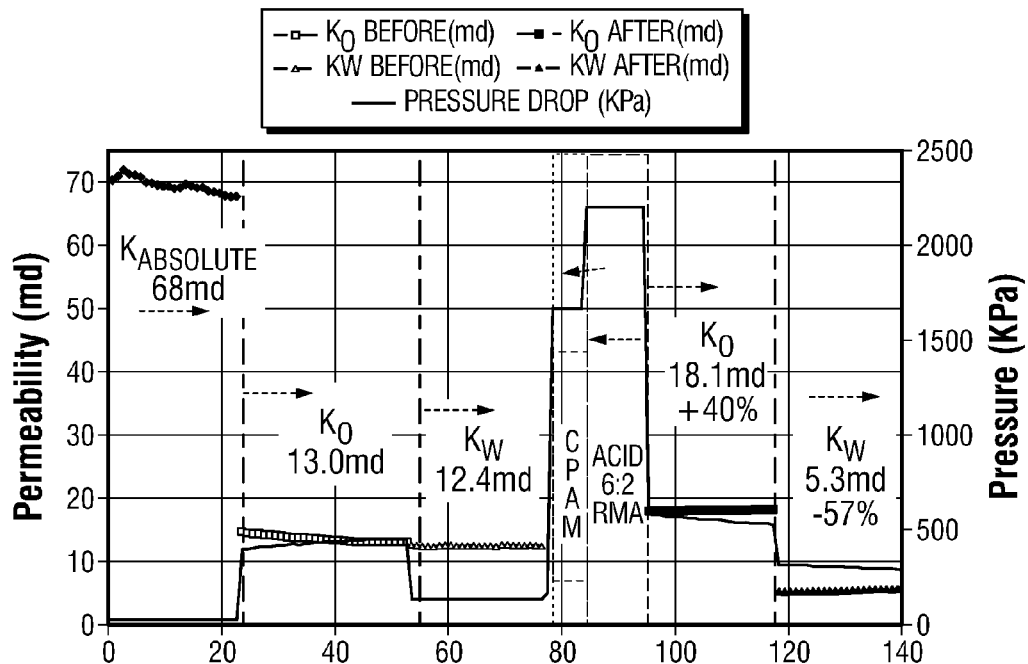
FIG. 9 shows a permeability/pressure plot for a core illustrating the changes in injection pressure and effective permeability to water before and after injecting a stage of each of CPAM/CPLB/guar fluid and of regular mud acid (RMA), according to an embodiment as described in Example 6.

The permeability/pressure plot vs. pore volumes is illustrated in FIG. 9. In this embodiment, the RMA fluid stimulates the core, increasing the effective permeability to oil and water, and the CPAM/CPLB/guar fluid disproportionately modifies the effective permeability to oft and water. This results in a higher final effective permeability to oil and a substantially lower effective permeability to water. The permeability changes are tabulated in Table 3 below.

TABLE 3

Permeability Changes in RPM Diverter Method

| Treatment/Test Stage | Permeability (mD) |
|---|---|
| Base | 68 |
| Oil (Ko) | 13.0 |
| Water (Kw) | 12.4 |
| Viscous RPM Fluid | — |
| Acid | — |
| Oil (Ko) | 18.1 |
| Water (Kw) | 5.3 |

The injection pressure of the acid (RMA) increased after the injection of the viscous RPM diverter stage. In the case where multiple zones are open in a formation and the acid injected into only one of them, there is a marked tendency to divert the acid away from the zone where it had been previously injected. After the acid treatment, the effective permeability to oil increased, but the effective permeability to water was reduced by more than half. This shows that the use of the viscous RPM treatment fluid as a diverter stage increased the permeability to oil; hence, oil production after the treatment is improved, while the production of water is greatly reduced.

Example 7

Permeability changes from RPM treatment fluid as a diverter during a matrix stimulation treatment with initial and ultimate acid treatment stages. This example investigated the effects of the viscous RPM treatment fluid as a diverter during a matrix stimulation treatment, with fluids injected into the matrix at a pressure below the fracture gradient. The testing involved establishing a baseline permeability to both oil and water and then injecting a train of fluids into the core while measuring the differences in the injection pressure, after which the permeability to both oil and water was again measured. An increase in the injection pressure at a constant flow rate (1 ml/min in this example) when injecting regular mud acid (RMA) at 6:2 HCl:HF after injecting the viscous RPM fluid indicates an effective decrease in the relative permeability to acid and so a tendency for the acid to be diverted away from the interval in which the viscous RPM fluid was injected.

A Bandera core was selected for testing because previous testing had shown that acid did not stimulate the matrix, but only had the effect of increasing the critical velocity with respect to fines migration. The same fluid as in Example 3 was used (3 g/L (25 ppt) CPAM, 1.8 g/L (15 ppt) guar, 1.6 g/L CPLB). The test sequence was as follows: (1) Measured absolute permeability of the core to water in the injection and producing directions at a rate of 1 ml/min; (2) Measured effective permeability of the core to oil in the producing direction using a volume sufficient to stabilize the differential pressure (DP) across the core, i.e., 20 pore volumes (PV) at 1 ml/min, following which, measured residual saturation to water; (3) Measured effective permeability of the core to water in the producing direction, using an injected volume sufficient to stabilize the DP across the core, i.e., 30 PV at 1 ml/min, following which measured the residual saturation of oil and determined the relative permeability by the JBN method; (4) Injected oil until reaching the irreducible water saturation (Swr) 1 ml/min; (5) Injected 8 PV of stimulation fluid (low viscosity RMA) at 1 ml/min while measuring DP; (6) Injected 10 PV of the viscous RPM treatment fluid at 1 ml/min; (7) Injected 8 PV of stimulation fluid (low viscosity RMA) at 1 ml/min while measuring DP; (8) Compared the DP in steps 5 and 7 (stimulation fluid injection before and after RPM diverter stage); (9) Shut in the core for 12 hours with treatment fluid in place; (10) Measured effective permeability to oil at Swr in the production direction and compared with value established in step 2; and (11) Measured the effective permeability to water at Sor, determined the relative permeability values using the JBN method and compared the results with those obtained in step 3.

Figure 10:
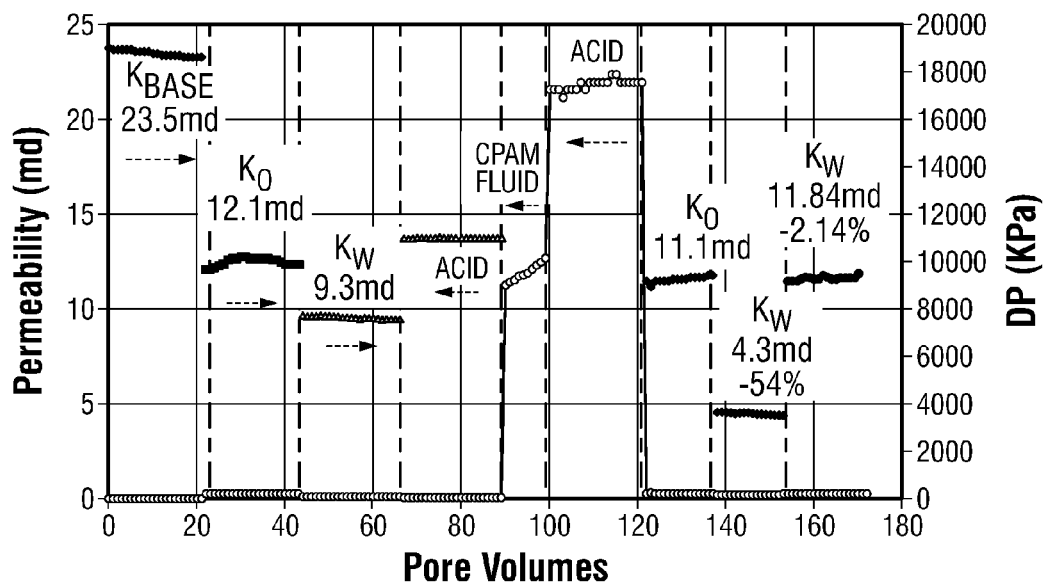
FIG. 10 shows a permeability/pressure plot for a core illustrating the changes in injection pressure and effective permeability to oil and water before and after injecting viscous CPAM/CPLB/guar fluid preceded and followed by stages of RMA, according to an embodiment as described in Example 7.

The permeability/pressure plot vs. pore volumes is illustrated in FIG. 10. In this embodiment, injecting the viscous CPAM/CPLB/guar fluid after a low viscosity acid at a constant rate results in an increase in the injection pressure, the equivalent of at least temporarily reducing the effective permeability of the matrix, which is maintained during the following low viscosity acid stage. During the treatment the following acid stage is injected into a more permeable interval which requires a lower injection pressure. Despite this, after the treatment the effective permeability to oil is unchanged while the effective permeability to water is substantially reduced. This indicates that the viscous fluid does not act to plug the pore throats in the matrix, but rather changes the residual water saturation in the matrix, i.e. at the surface of the pore spaces.

The principal changes are tabulated in Table 4 below.

TABLE 4

Permeability and Pressure Drop Changes in RPM Diverter Method

| Treatment/Test Stage | Permeability (mD) | Pressure Drop (MPa (psi)) |
|---|---|---|
| Base | 23.50 | 0.04 (5.8) |
| Oil (Ko) | 12.10 | 0.24 (34.6) |
| Water (Kw) | 9.30 | 0.1 (14.5) |
| Acid 1 | — | 0.07 (10.4) |
| Viscous RPM Fluid | — | 11.4 (1660) |
| Acid 2 | — | 16.8 (2440) |

TABLE 4-continued

Permeability and Pressure Drop Changes in RPM Diverter Method

| Treatment/Test Stage | Permeability (mD) | Pressure Drop (MPa (psi)) |
|---|---|---|
| Oil (Ko) | 11.84 | 0.22 (31.3) |
| Water (Kw) | 4.3 | 0.24 (35.4) |

The injection pressure of the acid (OCA) increased by 1.59 MPa (230 psi) after the injection of the viscous RPM diverter stage. In the case where multiple zones are open in a formation and the acid injected into only one of them, there is a marked tendency to divert the acid away from the zone where it had been previously injected. After the acid treatment, the effective permeability to oil was unchanged, but the effective permeability to water was reduced by about half. This shows that the use of the viscous RPM treatment fluid as a diverter stage did not reduce the permeability to oil; hence, oil production after the treatment remains the same, while the production of water is greatly reduced.

Example 8

Treatment of a formation.

A viscous RPM treatment fluid containing CPAM, CPLB and optionally guar, is effected using alternating stages of a low viscosity matrix acidizing treatment fluid. The formation has an interval height of more than about 6.1 m (20 ft), with known variations in permeability across the height of the interval to be treated and/or with known intervals with high water saturation. Following any preflush or wellbore cleanup, treatment proceeds to alternating injection stages of the viscous RPM treatment fluid and the low viscosity acidizing fluid, starting with one or the other, depending on the formation characteristics.

The number of stages of low viscosity acid and high viscosity RPM diverter is determined according to the height of the interval being treated and whether the well is producing excess water, i.e. a high water-to-oil ratio or cut, according to the following Table 5:

TABLE 5

Number of Stages

| Perforated Interval (m) | Acid Stages (No.) | RPM Diverter Stages (No.) | |
|---|---|---|---|
| | | High-Water-Cut Wells | Wells without a High Water Cut |
| 6 | 2 | 2 | 1 |
| 12 | 3 | 3 | 2 |
| 18 | 3 | 3 | 2 |
| 24 | 4 | 4 | 3 |
| 30 | 5 | 5 | 4 |
| 38 | 5 | 5 | 4 |
| 46 | 6 | 6 | 5 |

In the case of wells without a high water cut, the recommended stage volume is calculated for treatment at 250 L per meter of interval height. In these wells, in one example the acid stage is used as the first and last stages around the RPM diverter stage(s). For high-water-cut wells, an RPM diverter stage is preferably the initial stage and an acid stage is the ultimate stage. In these wells, the recommended stage volume is determined according to the height of the interval being treated and the extent of the water zone or zones relative to the treated interval, following Table 6:

TABLE 6

Recommended Stage Volume (L/m) for High-Water-Cut Wells

| Porosity (%) | Water Zone Is Less Than 30% of the Total Interval | Water Zone Is Greater Than 30% of the Total Interval |
|---|---|---|
| 10 | 124 | 124 |
| 15 | 248 | 186 |
| 20 | 372 | 248 |
| 25 | 497 | 310 |
| 30 | 621 | 372 |

The RPM diverter stage is prepared in this embodiment with 1.6 g/L CPLB, and the viscosity of the RPM diverter is adjusted by varying the amount of CPAM and/or guar, according to the following Table 7:

TABLE 7

Recommended CPAM/Guar Loading (g/L) in Diverter Stages

| Permeability | Temperature (° C.) | | | | | | | |
|---|---|---|---|---|---|---|---|---|
|  | 26-48 | | 48-65 | | 65-82 | | 82-115 | |
| (mD) | CPAM | Guar | CPAM | Guar | CPAM | Guar | CPAM | Guar |
| 20-100 | 2.4 | — | 2.4 | 0.6 | 2.4 | 0.9 | 2.4 | 1.2 |
| 100-300 | 2.4 | 0.6 | 2.4 | 0.9 | 2.4 | 1.2 | 2.4 | 1.8 |
| 300-500 | 2.4 | 0.6 | 2.4 | 1.2 | 2.4 | 1.8 | 3.0 | 2.4 |
| 500-1000 | 2.4 | 1.8 | 2.4 | 2.4 | 2.4 | 3.0 | 3.0 | 3.6 |
| 1000-1500 | 3.0 | 2.4 | 3.0 | 3.0 | 3.0 | 3.6 | 3.6 | 3.6 |
| >1500 | 3.0 | 2.4 | 3.0 | 3.6 | 3.6 | 3.6 | 3.6 | 3.6 |

The preceding description has been presented with reference to presently embodiments. Persons skilled in the art and technology to which this invention pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

All documents described herein are incorporated by reference herein, including any priority documents and/or testing procedures to the extent they are not inconsistent with this text.

What we claim is:

1. A method, comprising:
   (a) introducing into an initial first interval of a subterranean formation a viscous fluid comprising a hyposaline aqueous solution of first and second soluble, cationic polymers, wherein the first cationic polymer comprises a copolymer of acrylamide and a cationic comonomer, and wherein the copolymer comprises a cationicity from about 10 to about 70 mole percent and the second cationic polymer comprises a lipophilic base polymer structure; and
   (b) diverting with the viscous fluid a treating fluid from the initial first interval to an initial second interval.

2. The method of claim 1, wherein the treating fluid has a lower viscosity than the viscous fluid.

3. The method of claim 1, wherein the treating fluid comprises an acidizing fluid.

4. The method of claim 1, wherein the treating fluid comprises a relative permeability modifier.

5. The method of claim 4, wherein the treating fluid comprises a cationic polyacrylamide in an aqueous saline medium.

6. The method of claim 1, wherein the treating fluid comprises an aqueous saline fluid.

7. The method of claim 1, wherein the introduction and diverting comprise matrix injection at a pressure below the fracture pressure.

8. The method of claim 1, wherein the viscous fluid temporarily plugs pore throats in the first interval for the diversion of the treatment fluid to the second interval and thereafter increases the permeability of the first interval to hydrocarbons relative to water.

9. The method of claim 8, further comprising producing fluids from the first and second intervals into a wellbore.

10. The method of claim 1, further comprising repeating the introduction and diversion with subsequent first and second intervals.

11. The method of claim 10, wherein the subsequent first interval comprises the initial second interval.

12. The method of claim 1, wherein the cationic comonomer is selected from the group consisting of 2-acryloyloxyethyltrimethyl ammonium chloride (AETAC), 2-methacryloyloxyethyltrimethyl ammonium chloride (METAC), 3-acrylamidopropyltrimethyl ammonium chloride (APTAC), 3-methacrylamidopropyltrimethyl ammonium chloride (MAPTAC), and combinations thereof.

13. The method of claim 1, wherein the first cationic polymer comprises a copolymer of 50 to 80 mole percent acrylamide and 50 to 20 mole percent 2-methacryloyloxyethyltrimethyl ammonium chloride (METAC).

14. The method of claim 1, wherein the second cationic polymer comprises a polyquaternary ammonium and wherein the second cationic polymer is hydrolyzed to form a polymeric hydrolysate insoluble in the aqueous solution.

15. The method of claim 14, wherein the second cationic polymer comprises a homopolymer or copolymer of at least one monomer selected from the group consisting of the acid addition salts of 2-acryloyloxyethyltrimethyl ammonium, 2-methacryloyloxyethyltrimethyl ammonium, 3-acrylamidopropyltrimethyl ammonium, 3-methacrylamidopropyltrimethyl ammonium, 2-acryloyloxyethyltriethyl ammonium, 2-methacryloyloxyethyltriethyl ammonium, 3-acrylamidopropyltriethyl ammonium, 3-methacrylamidopropyltriethyl ammonium and combinations thereof.

16. The method of claim 15 wherein the acid comprises methyl sulfate anion, ethyl sulfate anion or a combination thereof.

17. The method of claim 14, wherein the second cationic polymer comprises methacrylate copolymer.

18. The method of claim 14, wherein the second cationic polymer comprises a methyl sulfate or ethyl sulfate quaternized polymer of a monomer selected from the group consisting of 2-methacryloyloxyethyltrimethyl amine, 3-methacrylamidopropyltrimethyl amine, 2-methacryloyloxyethyltriethyl amine, 3-methacrylamidopropyltriethyl amine or a combination thereof.

19. The method of claim 14, wherein the second cationic polymer comprises poly((2-methacryloyloxy)ethyltrimethyl ammonium methyl sulfate).

20. The method of claim 1, wherein the viscous fluid further comprises a hydrated polysaccharide.

21. The method of claim 20, wherein the polysaccharide comprises galactomannan.

22. The method of claim 1, wherein the viscous fluid further comprises guar.

23. The method of claim 1, wherein the viscous fluid comprises an inorganic saline content less than 0.3 percent by weight of the solution.

24. The method of claim 1, wherein the viscous fluid comprises a viscosity at a temperature of 60° C. and shear rate of 100/s of at least 50 mPa·s.

25. A method, comprising the steps of:
  (a) introducing into an initial first interval of a subterranean formation at a pressure below the fracture pressure a viscous fluid comprising from 0.6 to 7.2 g/L (5 to 60 ppt) of a cationic polyacrylamide, from 0.12 to 2.4 g/L (1 to 20 ppt) of a polyquaternary amine comprising a lipophilic base polymer structure, and from 0.6 to 7.2 g/L (5 to 60 ppt) of a galactomannan, in an aqueous medium comprising an inorganic saline content less than 0.05 percent by weight of the solution, wherein the cationic polyacrylamide comprises a copolymer of from 50 to 80 mole percent acrylamide and from 50 to 20 mole percent of a cationic comonomer, wherein the lipophilic base polymer structure in the polyquaternary amine comprises polymethacrylate, wherein the fluid comprises a viscosity at a temperature of 60° C. and shear rate of 100/s of at least 50 mPa·s, wherein the viscous fluid temporarily plugs pore throats in the first interval and thereafter increases the permeability of the first interval to hydrocarbons relative to water; and
  (b) diverting with the viscous fluid a matrix acidizing treatment fluid from the first interval to a second interval, wherein the first interval comprises a higher relative permeability ratio kw/ko than that of the second interval, wherein the matrix acidizing treatment fluid has a lower viscosity at a temperature of 60° C. and shear rate of 100/s relative to the viscous fluid;
  (c) repeating steps (a) and (b) a plurality of times with a like plurality of subsequent first and second intervals;
  (d) thereafter producing fluids from the initial and subsequent first and second intervals into a wellbore, whereby production of hydrocarbons relative to water is increased with respect to production of hydrocarbons relative to water prior to the method.

* * * * *